US008912913B2

(12) United States Patent
Martins

(10) Patent No.: US 8,912,913 B2
(45) Date of Patent: Dec. 16, 2014

(54) ALERT FOR DISPLAY PROTECTION

(71) Applicant: Hewlett-Packard Development Company, L.P., Houston, TX (US)

(72) Inventor: Helio Manuel Mealha Martins, Paco de Arcos (PT)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 13/755,211

(22) Filed: Jan. 31, 2013

(65) Prior Publication Data

US 2014/0210629 A1  Jul. 31, 2014

(51) Int. Cl.
*G08B 21/00* (2006.01)
*G06F 1/16* (2006.01)

(52) U.S. Cl.
CPC ................. *G06F 1/1613* (2013.01)
USPC .............. 340/686.1; 340/686.6; 340/540

(58) Field of Classification Search
CPC .. G08B 3/10; G08B 21/0213; G08B 13/1427; G06F 1/1616; G06F 1/165; G06F 1/169; G06F 11/325; G06F 2200/1636; G06F 3/03547; G06F 21/35; G06F 21/88
USPC ............ 340/686.1, 686.6, 546, 545.1, 545.6, 340/540, 568.1, 7.58, 571, 691.1, 693.5; 345/168, 169, 173, 175
See application file for complete search history.

(56) References Cited

U.S. PATENT DOCUMENTS

| 7,349,199 | B2 | 3/2008 | Tracy et al. |
| 7,864,036 | B2* | 1/2011 | Hanyu ........................ 340/506 |
| 8,014,139 | B2 | 9/2011 | Maeda et al. |
| 8,098,233 | B2 | 1/2012 | Hotelling et al. |
| 8,195,243 | B2 | 6/2012 | Kim et al. |
| 8,593,512 | B2* | 11/2013 | Lian et al. ........................ 348/61 |
| 8,599,033 | B2* | 12/2013 | Konno et al. ............. 340/686.1 |
| 2010/0164740 | A1* | 7/2010 | Lo et al. .................... 340/686.6 |
| 2012/0218191 | A1 | 8/2012 | Huang et al. |
| 2013/0009875 | A1* | 1/2013 | Fry et al. ...................... 345/168 |

OTHER PUBLICATIONS

Tips for Protecting Your Laptop, (Web Page). http://www.jcs-pcs.com/Protecting%20Your%20Laptop-%20Good%20Screen.html > Jan. 4, 2013.

* cited by examiner

*Primary Examiner* — Anh V La
(74) *Attorney, Agent, or Firm* — Hewlett-Packard Patent Development; Robert McDowell

(57) ABSTRACT

Examples provide mechanisms for detecting an object disposed between a display of a computing device and a base of the computing device. In response to detection of the object between the display of the computing device and the base of the computing device, the computing device may output an alert via a speaker.

20 Claims, 5 Drawing Sheets

ALERT FOR DISPLAY PROTECTION

BACKGROUND

Computing systems such as notebook computers utilize displays generally housed within a display panel and computing components generally housed within a base. The computing system may attach the display panel to the base with a hinge such that the display may be opened and closed in a clamshell-like manner. The opening and closing of the computer system may occur in various power states, including but not limited to states when the operating system is active or hibernating.

DETAILED DESCRIPTION

Computing devices such as notebook computers, among others, utilize a clamshell-like housing in which the display is rotated about a hinge to open and close the notebook computer. In a closed position, the display is moved adjacent to the keyboard such that the display and keyboard are protected by the housing. In an open position, the display is moved perpendicular to the base such that a user can utilize the keyboard and interact with the display.

To minimize space, weight, and material, the components of the notebook computer (e.g., the display and the base, among others) are manufactured to tight tolerances. As such, any space between the display and base, while in a closed position, is minimal. This minimal space may facilitate damage to the display or base should pressure be applied to the housing while in a closed position. Furthermore, should a user of the device leave an object, for example a pen, on a portion of the base and attempt to close the notebook, the tight tolerances may force the object into the display thereby causing damage to the computing system.

In the instant disclosure, various mechanisms to prevent such damage to computing systems are disclosed. More specifically, computing devices, articles of manufacture, and methods are disclosed which enable an output of an alert in response to detection of an object between the display and the base. In various examples, the detection of the object may be in response to movement of the display or an indication of movement of the display. These mechanisms may function independent of various applications, such as an operating system, thereby enabling protection while the computer system operates in multiple states.

Figure 1:
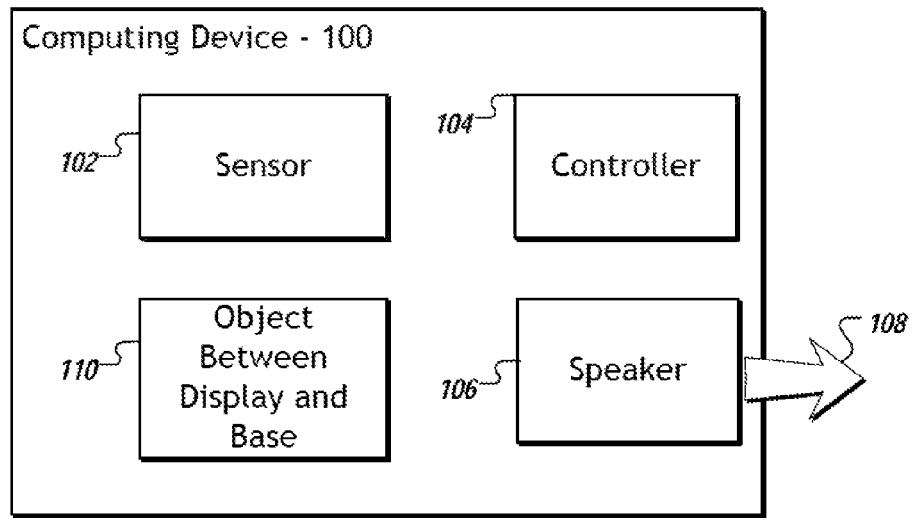
FIG. 1 is a block diagram of a computing device in accordance with an example of the present disclosure.

Referring to FIG. 1, a computing device 100 is illustrated in accordance with the present invention. The computing device may be a notebook computer, mobile phone, or other portable device utilizing a clamshell-like housing. The computing device 100 may include a sensor 102 to detect an object 110 disposed between a display and a base of the computing device, and a controller 104 coupled to the sensor 102 to output an alert 108 via a speaker 106 in response to detection of the object to protect the display.

In various examples, the sensor 102 may be a sensor configured to determine whether an object is positioned between the display and the base of the computing device. The sensor 102 may be disposed on the display portion of the computing device 100 or alternatively on the base portion of the computing device 100. Various sensors may be utilized to detect the object 110, for example, sensor 102 may be a volumetric sensor, a camera sensor, or a mechanical sensor among others. A volumetric sensor, as used herein, is a device that can detect shapes or objects via monitoring a volume of an area, or utilizing one or more signals to detect the presence of objects within the area.

The controller 104 may be an application specific integrated circuit ("ASIC"), a processor configured to receive and execute instructions stored as programming instructions on non-transitory computer readable media, a programmable logic device, or a combination of logic. The controller 104 is to receive data indicating detection of an object between the display and the base of the computing device and transmit one or more signals to a speaker 106 to output an alert 108. In various examples, the alert 108 may be an audible response such as a beep or alarm. In other examples, the alert may be a haptic response, such as a vibration. With the alert output via the speaker 106, a user may be alerted to the presence of the object disposed between the display and the base prior to the computing device incurring any damage.

Figure 2:
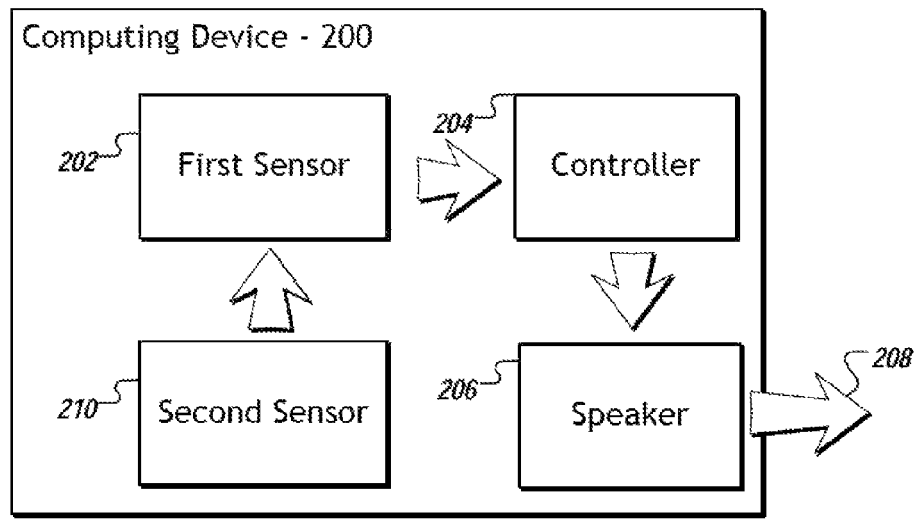
FIG. 2 is a block diagram of a computing device in accordance with an example of the present disclosure.

Referring to FIG. 2, another block diagram of a computing device 200 is illustrated in accordance with an example of the present disclosure. The computing device 200 may be a notebook computer, mobile phone, or other computing device utilizing a clamshell-like housing. As illustrated, the computing device 200 includes a first sensor 202, a second sensor 210, a controller 204, and a speaker 206. The computing device 200 may include other components without deviating from the present disclosure.

Similar to FIG. 1, the first sensor 202 may be a sensor configured to detect the presence of an unintended object disposed between a display of the computing device 200 and the base of the computing device 200. The sensor may be a volumetric sensor, a mechanical sensor, or in some examples, a camera.

The second sensor 210 may be coupled to the first sensor 202. The second sensor 210 may be a sensor configured to detect movement of the display or an intention to move the display. For example, the second sensor 210 may be an accelerometer configured to determine that the display is moving relative to the base or the second sensor 210 may be a touch-sensitive sensor disposed in a location such that upon detecting contact with a user, an intention to close or move the display is understood.

In various examples, the second sensor 210 may be active or powered during multiple states of the computer. For example, the second sensor 210 may be active during a powered stated of the computing device and during a sleep state of the computing device. While the second sensor 210 is active, the first sensor 202 may be maintained in a lower power state. The first sensor 202 may be activated or initiated in response to a determination by the second sensor that the display is transitioning between an open and closed position. In another example, both the first sensor 202 and the second sensor 210 may remain active in multiple power states of the computing device, that is the first sensor 202 and the second sensor 210 may operate independent of a power state of the computing device.

Similar to FIG. 1, the controller 204 may be an ASIC, a processor configured to receive and execute instructions stored as programming instructions on non-transitory computer readable media, a programmable logic device, or a combination of logic. The controller 204 is to receive data indicating detection of an object between the display and the base of the computing device and transmit one or more signals to a speaker 206 to output an alert 208. The controller 204 similar to the first sensor 202 and the second sensor 210 may operate independent of a power state of the computing device. In various examples, the alert 208 may be an audible response such as a beep or alarm. In other examples, the alert may be a haptic response, such as a vibration.

In one example, computing device 200 is a notebook computer. The second sensor 210 is coupled to a display and is to detect movement of the display from an open position to a closed position. In response to detecting movement of the display, the second sensor 210 may initialize the first sensor 202 to determine whether an object is disposed between the display and the base of the computing device 200. In response to the detecting an object between the display and the base, a controller 204 coupled to the first sensor 202 is to output an alert 208 via a speaker 206 to protect the display. In this manner, a user may be alerted to the existence of an object that may damage the display as it is brought into a closed position adjacent to the base.

Figure 3:
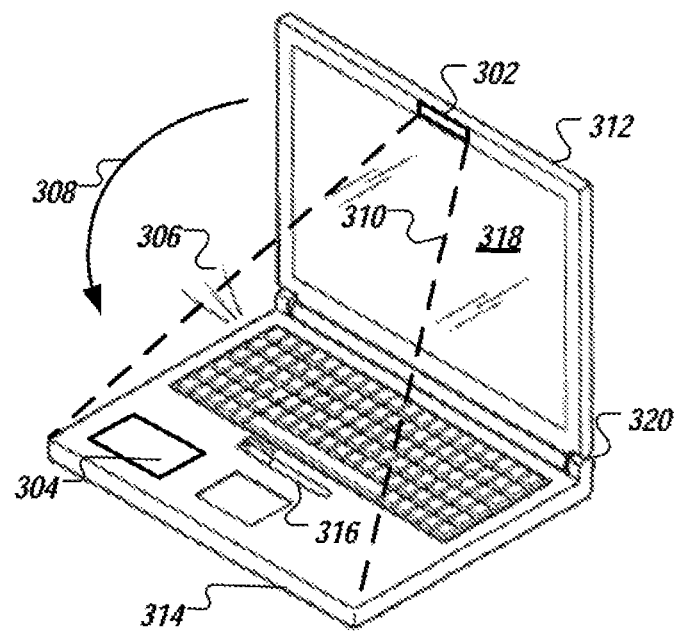
FIG. 3 is a perspective view of a front side of a computing device in accordance with the present disclosure.

Referring to FIG. 3, a perspective view of a front side of a computing device is illustrated in accordance with an example of the present disclosure. The computing device in FIG. 3 illustrates a notebook computer in an open position where the display 318 is generally perpendicular to the base 314. The computing device includes a first sensor 302 disposed above the display 318, a controller 304 illustrated as a box within the base 314, a second sensor 312 disposed on a back side of the display 318.

In the illustrated example, the second sensor 312 is a touch-sensitive sensor. The touch-sensitive sensor is disposed along a top edge one the back of the display 318. In this position, the touch-sensitive sensor 312 when contacted may determine that a user is attempting to transition the display 318 to a closed position along arrow 308. In response to detecting contact, the first sensor 302, illustrated here as a volumetric sensor, may determine whether an object is located between the display 318 and the base 314.

The volumetric sensor 302 may determine whether an object is disposed between the display and the base by determining a volume of space between the display 318 and the base 314. As illustrated, the volumetric sensor 302 may determine a volume of space encompassed by lines 310, the surface of the base 314, and the surface of the display 318. The volume measurement may then be compared to a threshold value. In various examples, the threshold value may be a value determined based on having no objects disposed between the display 318 and the base 314 and an error factor.

In another example, the volumetric sensor 302 may determine whether an object is disposed between the display 318 and the base 314 utilizing various signals, for example ultrasound waves. In such an example, the volumetric sensor 302 may utilize a signal to generate a pattern, wherein the pattern describes what the signal encountered during its propagation to and from the base 314 (e.g., a reflection). The generated pattern may then be compared against a stored pattern in which no unintended objects are disposed between the display of the computing device and the base of the computing device. Alternatively, the controller 304 may be configured to analyze the pattern or data returned from the volumetric sensor 302 to identify the presence of the object.

In the illustrated example, the volumetric sensor 302 may determine that an object, illustrated as a pen 316, is disposed between the display 318 and the base 314. In response, controller 304 may control a speaker to output an alert 306. The alert as illustrated is an audible response to alert the user to a presence of an object, which may damage the display 318 should the display continue to transition along path 308 to a closed position.

In another example, still with reference to FIG. 3, the computing device may incorporate a second sensor 320 in a hinge of the computing device. The second sensor 320 may be an accelerometer configured to determine that the display 318 is in transition to a closed position. The accelerometer 320 may be disposed in the hinge as illustrated in FIG. 3, or in other examples, may be disposed in various other portions of the computing device.

Figure 4:
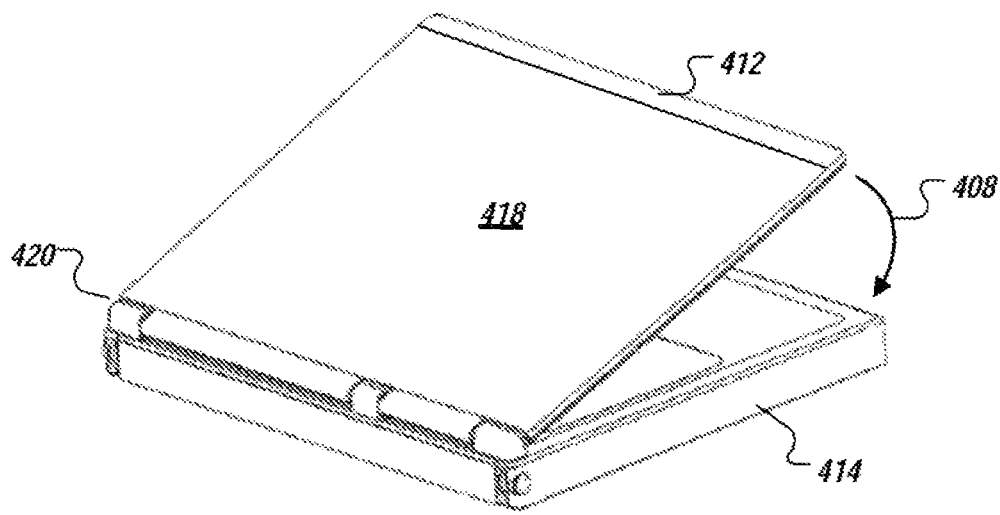
FIG. 4 is a perspective view of a back side of a computing device in accordance with the present disclosure.

Referring to FIG. 4, a perspective view of a backside view of a computing device is illustrated in accordance with an example of the present disclosure. The computing device includes a display portion 418, a base portion 414, and a second sensor 412, which may be a touch-sensitive sensor. In another example, the second sensor may be an accelerometer 420 housed within the hinge of the computing device. As illustrated, the display 418 is to transition between open and closed positions as indicated by arrow 408.

The touch sensitive sensor 412, as illustrated may be disposed along a top portion on the backside of the display 418. The backside of the display 418 is generally the location of contact for a user's hand when they are attempting to gain leverage to close the display 418. Other locations for touch-sensitive sensors 412 may include the side portions of the display 418, thereby forming a frame-like touch-sensitive area. The touch-sensitive sensor 418 may function, in addition to the second sensor, as a window for a wireless antenna. As various computing devices utilize housings which impede the transmission of signals over wireless mediums, the touch-sensitive sensor 412 may comprise a material conducive to the propagation of signals.

The accelerometer 420, as illustrated, is housed within a hinge of the display 418. The accelerometer may be disposed in various other areas of the display 418, an in various examples, may be utilized in conjunction with the touch-sensitive sensor 412. The accelerometer 420 is to detect movement of the display 418 relative to the base 414.

Figure 5:
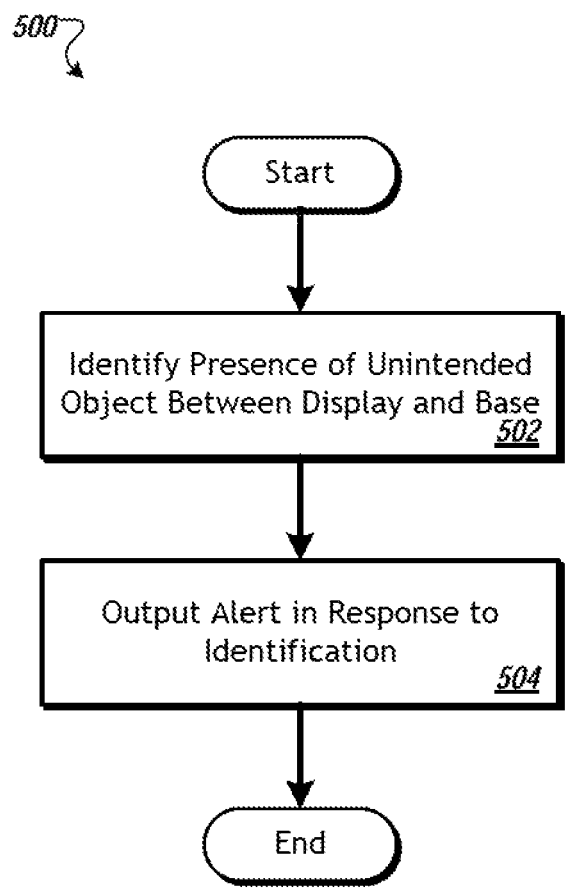
FIGS. 5-6 illustrate flow diagrams in accordance with various examples of the present disclosure.
Figure 6:
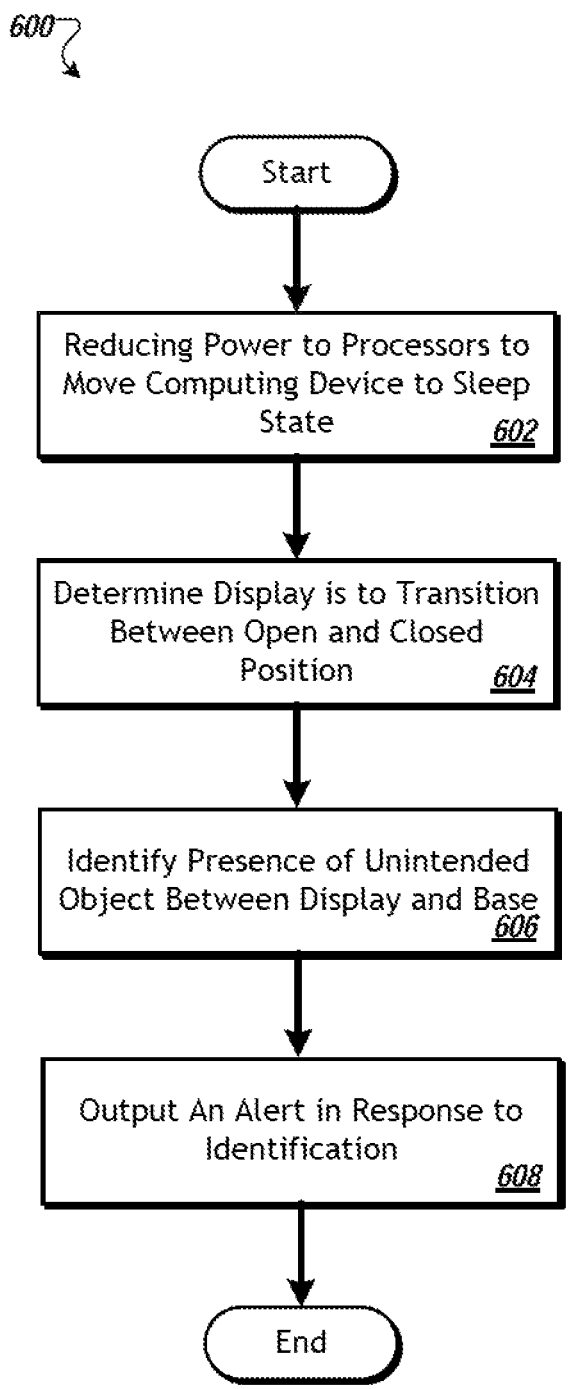

Referring to FIGS. 5-6 various flow diagrams are illustrated in accordance with examples of the present disclosure. While the flow diagrams illustrate various elements in a particular order, they are not meant to be so limiting. Rather, it is expressly contemplated that elements may occur in different orders or contemporaneously with the listed elements. Additionally, the flow diagrams are not to be construed that all illustrated elements are necessary for all examples.

Referring to FIG. 5, the method may begin at 502 with a computing device identifying, via a sensor, a presence of an unintended object disposed between a display and a base of the computing device. As used herein, an unintended object is an object that is disposed between the display and the base of the computing device, and that will interfere with the transition of the display between an open position and a closed position, or that will damage either the display or the base as the display transitions between the open and closed position.

Upon identifying the presence of the unintended object, the computing device may output an alert to protect the display. The alert, in various examples may be an audible response, a haptic response, or another response capable of alerting a user to the presence of the unintended object prior to completion of the display contacting the base and/or the unintended object. The method may then end.

Referring to FIG. 6, the method may begin at 602 the computing device may reduce power to one or more processors to move the computing device to a sleep state. Computing devices may operate in various states to increase longevity of a battery. In these various power states, different hardware may or may not be active. In the instant example, the processors may be in a sleep state to reduce their power draw.

Once in a reduced power state, the computing device may determine that the display is to transition between an open and a closed position at 604. In various examples, determining that the display is to transition between the open and closed position may comprise a determination that the display is transitioning between the open and closed positions. The determination that the display is transitioning may occur via an accelerometer disposed within the computing device. In another example, determining that the display is to transition between the open and closed position may comprise a touch-sensitive sensor determining that a user is contacting a back side of the display, the contact indicating intent to transition the display between an open position and a closed position.

In response to detecting movement via the accelerometer, or detecting user contact via the touch-sensitive sensor, a sensor may identify a presence of an unintended object disposed between the display and the base at 606. Identifying the presence of the unintended object may comprise the use of a sensor such as a volumetric sensor. In such an example, the volumetric sensor is to identify the presence of the unintended object by comparing a volume between the display and the base with a threshold value. The threshold value may be a measurement value of the area between the display and the base without an unintended object. The threshold may include an error factor to prevent unnecessary alerts when closing a notebook. In other examples, the volumetric sensor may identify the presence of the unintended object utilizing pattern comparisons. The patterns may be generated utilizing various signals, for example ultrasound signals.

In response to identifying the presence of the unintended object, the computing device may output an alert at 608. The alert may be a haptic response, an audible response, or another response to alert the user to the presence of the unintended object. The alert may be an alarm output via a speaker of the computing device. The method may then end.

While discussing the reduction of power as a precursor to various elements within FIG. 6, it is noted that the computing device may move from one power state to another power state before, after, or concurrently with various elements. For example, a computing device may change state from a fully active state in which the central processing unit ("CPU") receives power to run an operation system among other applications, to a low power state in which computing device is hibernating. In such a hibernation state, the indications of display movement, the identification of the presence of the unintended objects, and output of alerts may be handled via a BIOS, such that the various elements are executed independent of the OS.

Figure 7:
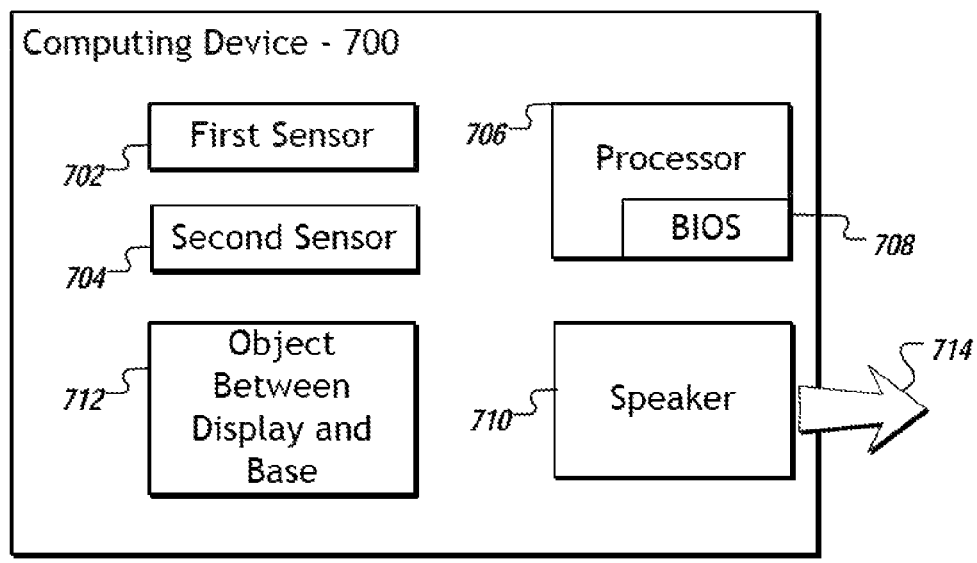
FIG. 7 illustrates a block diagram of a computing system in accordance with the present disclosure.

Referring to FIG. 7, a block diagram is illustrated in accordance with an example of the present disclosure. The computing device includes a first sensor 702, a second sensor 704, a processor 706 configured to execute code stored as a BIOS 708, and a speaker 710 to output an alert 714. In the illustration, an object is disposed between the display and the base.

In one example, the computing device may execute the instructions stored as the BIOS 708 via processor 706 to detect, via a sensor 702, that an object 712 is disposed between a display of the computing device and a base. In response to detection of the object, the computing device may output an alert 714 via a speaker 710 of the computing device to protect the display.

In another example, the computing device 700, via the BIOS 708, may monitor a second sensor 704 for an indication of display movement. An indication of display movement may be the detection of movement of the display relative to the base, via for example, an accelerometer. Another indication of movement in various examples may be the detection of contact, via a touch-sensitive sensor, of a user with a backside of the display, wherein the contact indicates intent to move the display relative to the base of the computing system. In other words, an indication of movement may be data of imminent or current movement of a display relative to the base.

In response to the indication of display movement, the BIOS 708 may enable the computing device to detect, via a first sensor 702 such as a volumetric sensor, a volume between the display and the base of the computing device. In response to the detected volume, the BIOS 708 may enable the computing device to compare the volume to a threshold value to detect that the object 712 is disposed between the display and the base of the computing system. In another example, the volumetric sensor may identify the presence of the unintended object utilizing pattern comparisons. The patterns may be generated utilizing various signals, for example ultrasound signals. In response to detection of the object, the computing device may output an alert.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A computing device, comprising:
   a sensor to detect an object disposed between a display and a base of the computing device; and
   a controller coupled to the sensor, wherein the controller is to output an alert in response to detection of the object to protect the display.

2. The computing device of claim 1, further comprising:
   a second sensor coupled to the display, wherein the second sensor is to detect movement of the display from an open position to a closed position; and
   wherein the sensor is to detect the object in response to the detected movement of the display from the open position to the closed position.

3. The computing device of claim 2, wherein the second sensor, the sensor, and the controller operate independently of a power state of the computing device.

4. The computing device of claim 1, further comprising:
   a second sensor coupled to the display, wherein the second sensor is a touch-sensitive sensor to detect user contact with a back portion of the display; and
   wherein the sensor is to detect the object in response to the detected user contact with the back portion of the display.

5. The computing device of claim 1, wherein the sensor is a volumetric sensor.

6. The computing device of claim 1, wherein the controller is to output the alert using a speaker in response to detection of the object and an indication that the display is in transition to a closed position.

7. A method, comprising:
- detecting, by a computing device using an output of a first sensor, movement of a display of the computing device or touch of the display by a user;
- in response to the detecting of the movement of the display or the touch of the display by the user, identifying, by the computing device using an output of a second sensor, a presence of an object disposed between the display and a base of the computing device; and
- outputting, by the computing device, an alert in response to identifying the presence of the object to protect the display.

8. The method of claim 7, wherein the detecting of the movement of the display comprises detecting that the display is transitioning between an open position and a closed position.

9. The method of claim 8, wherein the first sensor includes an accelerometer of the computing device.

10. The method of claim 7, wherein the second sensor includes a touch-sensitive sensor of the computing device, the touch-sensitive sensor detecting user contact with a back side of the display, the contact indicating an intent to transition the display between an open position and a closed position.

11. The method of claim 7, wherein identifying the presence of the object comprises comparing a volume between the display and the base with a threshold value, the volume measured by the second sensor.

12. The method of claim 7, wherein identifying the presence of the object comprises utilizing a signal to generate a pattern by the second sensor; and
- analyzing, by the computing device, the pattern to identify the presence of the object.

13. The method of claim 7, further comprising:
- reducing, by the computing device, power to one or more processors of the computing device to transition the computing device to a sleep state prior to the identifying.

14. A non-transitory computer readable medium comprising a basic input output system (BIOS), which if executed by a processor of a computing device, cause the computing device to:
- detect, via a sensor, that an object is disposed between a display of the computing device and a base of the computing device; and
- in response to detection of the object, output an alert via the computing device to protect the display.

15. The non-transitory computer readable medium of claim 14, wherein the BIOS, if executed by the processor of the computing device, further cause the computing device to:
- monitor a second sensor for an indication of display movement; and
- detect, based on output of the sensor, the object disposed between the display and the base, in response to the indication of display movement.

16. The non-transitory computer readable medium of claim 14, wherein the BIOS, if executed by the processor of the computing device, further cause the computing device to:
- detect, via a second sensor, movement of the display relative to the base of the computing system,
- wherein the detecting that the object is disposed between the display and the base is performed in response to the detecting of the movement of the display via the second sensor.

17. The non-transitory computer readable medium of claim 14, wherein the second sensor includes an accelerometer.

18. The non-transitory computer readable medium of claim 14, wherein BIOS, if executed by the processor of the computing device, further cause the computing device to:
- detect, via a touch-sensitive sensor, contact of a user with a backside of the display, wherein the contact indicates an intent to move the display relative to the base of the computing system,
- wherein the detecting that the object is disposed between the display and the base is performed in response to the detecting of the contact of the user with the backside via the touch-sensitive sensor.

19. The non-transitory computer readable medium of claim 14, wherein the BIOS, if executed by the processor of the computing device, cause the computing device to:
- detect, via a volumetric sensor, a volume between the display and the base of the computing device; and
- compare the volume to a threshold to detect that the object is disposed between the display and the base of the computing device.

20. The non-transitory computer readable medium of claim 14, wherein the BIOS, if executed by the processor of the computing device, cause the computing device to:
- generate, via a volumetric sensor, a pattern based on a propagation of a signal to and from the base; and
- analyze the pattern to detect that the object is disposed between the display and the base of the computing device.

* * * * *